United States Patent

Arahata et al.

[11] Patent Number: 5,975,862
[45] Date of Patent: Nov. 2, 1999

[54] PORTABLE POWER TOOL WITH VIBRATION-PROOF MEMBER

[75] Inventors: Kouji Arahata, Higashiyamato; Kengo Kubo, Yokohama, both of Japan; Larry N. Will, Spring Grove, Ill.

[73] Assignee: Kioritz Corporation, Tokyo, Japan

[21] Appl. No.: 09/041,593

[22] Filed: Mar. 13, 1998

[30] Foreign Application Priority Data

Mar. 19, 1997 [JP] Japan .................................. 9-086129

[51] Int. Cl.$^6$ ...................................................... F04B 17/09
[52] U.S. Cl. ........................... 417/234; 417/359; 417/363
[58] Field of Search ..................................... 417/359, 363, 417/234, 572; 15/344, 405, 412

[56] References Cited

U.S. PATENT DOCUMENTS

| | | | |
|---|---|---|---|
| 4,223,419 | 9/1980 | Sato et al. .................................. | 15/327 |
| 4,674,146 | 6/1987 | Tuggle et al. .............................. | 15/330 |
| 5,035,586 | 7/1991 | Sadler et al. .............................. | 417/363 |
| 5,221,192 | 6/1993 | Heflin et al. .............................. | 417/363 |
| 5,269,665 | 12/1993 | Sadler et al. ............................. | 417/363 |

*Primary Examiner*—Charles G. Freay
*Attorney, Agent, or Firm*—Michael D. Bednarek; Crowell & Moring LLP

[57] ABSTRACT

A power source and a human contacting portion of a portable power tool, with a vibration-proof member and a spacer placed between them, are tightened by fastening and connecting means in the direction approaching each other. The spacer serves to limit compressive power of the vibration proof member which acts between the power source and human contacting portion within effective vibration-proof range of the vibration-proof member by utilizing the fastening and connecting means, This does not cause the vibration absorbing effect of the vibration-proof member to be lost. In addition, there is no need to check the fastening degree achieved by the fastening and connecting means, thus allowing easy attachment of the vibration-proof member thereto. Alternatively, vibration-proof members may be placed between the power source side and the working member side without spacers if the vibration proof members support the power source apart from the working member. To facilitate this construction a universal power transmission, such as a flexible shaft or coupling, is used to transmit rotation power from the power source to the working member in spite of a change in the relative positional relation of the power source to the working member, caused by the vibration-proof member.

5 Claims, 6 Drawing Sheets

PORTABLE POWER TOOL WITH VIBRATION-PROOF MEMBER

BACKGROUND OF THE INVENTION

1. Field of the Invention

This invention relates generally to a portable power tool such as a power blower, engine cutter, chain saw, power sprayer and the like and more particularly to an improved portable power tool adapted to reduce vibration transmitted from a power source to a human body contacting portion such as a grip.

2. Background

Vibration-proof member such as rubber, springs and the like is generally disposed between the power source and the human body contacting portion in various conventional portable power tools, to reduce such vibration transmitted from the power source such as an internal combustion engine to a human body contacting portion including a grip, etc.

Such conventional methods are not always practical. In some instances, the vibration-proof member is difficult to attach and the vibration prevention effect cannot be satisfactorily obtained.

SUMMARY OF THE INVENTION

An object of the present invention is to provide a highly practical portable power tool adapted to effectively reduce the vibration transmitted from a power source to a human body contacting portion by using an easy means.

To achieve this object, the portable power tool is designed to include a power source and a human body contacting portion with a vibration-proof member disposed between the power source and the human body contacting portion to absorb the vibration transmitted from the power source to the human body contacting portion, means for fastening the power source and the human body contacting portion in the direction approaching each other and connecting them, and a spacer for limiting the vibration-proof member's compressive power which acts between the power source and the human body contacting portion within the effective vibration-proof range by using the fastening and connecting means.

The human body contacting portion refers to an object such as a grip, backpack frame and the like which directly contact a human body during operation. Materials such as rubber, springs and the like having highly vibration-absorbing property may be used as the vibration-proof member.

In the present invention, using the fastening and connecting mean described above, by fastening both the power source and the human body contacting portion while they are approaching each other, the vibration-proof member can be compressed therein. If the vibration-proof member should be compressed to such a degree that exceeds the effective vibration-proof action range, the vibration-absorbing effect by the vibration-proof member is canceled. But the spacer limits the compressive power within the effective vibration-proof range, so that the vibration-proof effect by the vibration-proof member is maintained. In addition, there is no need to check the fastening degree achieved by the fastening and connecting means, thus allowing easy attachment of the vibration-proof member.

A bolt may be used as the fastening and connecting means, and a pipe into which the bolt is inserted may be used as a spacer. A stepped bolt may be used both as the fastening and connecting means and the spacer. The use of the stepped bolt reduces the number of parts.

When the pipe is used, the use of a pipe having a flange integrally at the end portion, the flange being served as a washer can reduce the parts count as well.

A portable power tool in accordance with another embodiment of the present invention comprises a power source, a working member driven by the power source, a human body contacting portion disposed on the working member side, a vibration-proof member placed between the power source and the working member to absorb the vibration transmitted from the power source side to the working member side and universal power transmission means which can transmit rotation power from the power source to the working member in spite of a change in the relative positional relation, caused by the vibration-proof member, between an output axis of the power source and an input axis of the working member.

The vibration-proof member adapted to absorb the vibration transmitted from the power source to the working member can prevent the transmission of vibration to the human body contacting portion in spite of a change in the positional relation between the output and input axes. Specifically, these two axes are connected through the universal power transmission means, the vibration-proof member is not an obstacle to the transmission of rotation power therein.

Thus, the present invention provides a power source and a human contacting portion of a portable power tool, with a vibration-proof member and a spacer placed between them, are tightened by fastening and connecting means in the direction approaching each other. The spacer serves to limit compressive power of the vibration proof member which acts between the power source and human contacting portion within effective vibration-proof range of the vibration-proof member by utilizing the fastening and connecting means, This does not cause the vibration absorbing effect of the vibration-proof member to be lost. In addition, there is no need to check the fastening degree achieved by the fastening and connecting means, thus allowing easy attachment of the vibration-proof member thereto. Alternatively, vibration-proof members may be placed between the power source side and the working member side without spacers if the vibration proof members support the power source apart from the working member. To facilitate this construction a universal power transmission, such as a flexible shaft or coupling, is used to transmit rotation power from the power source to the working member in spite of a change in the relative positional relation of the power source to the working member, caused by the vibration-proof member.

DETAILED EXPLANATION OF THE PREFERRED EMBODIMENTS OF THE INVENTION

A preferred embodiment will be hereinafter described with reference to the accompanying drawings.

A portable power tool in accordance with the embodiment will be explained by reference to a hand-held power blower of the type that is used to blow off fallen leaves, dust, and dirt, etc., by applying wind pressure, as an example. It is noted, however, that the portable power tool of the present invention should not be construed as limited to only the power blower set forth therein. Indeed, those skilled in the art will appreciate that the present invention is readily adaptable to engine cutters, chain saws, power sprayers and like equipment in which vibration is transmitted from a power source to a human body contacting portion such as a grip.

Figure 1:
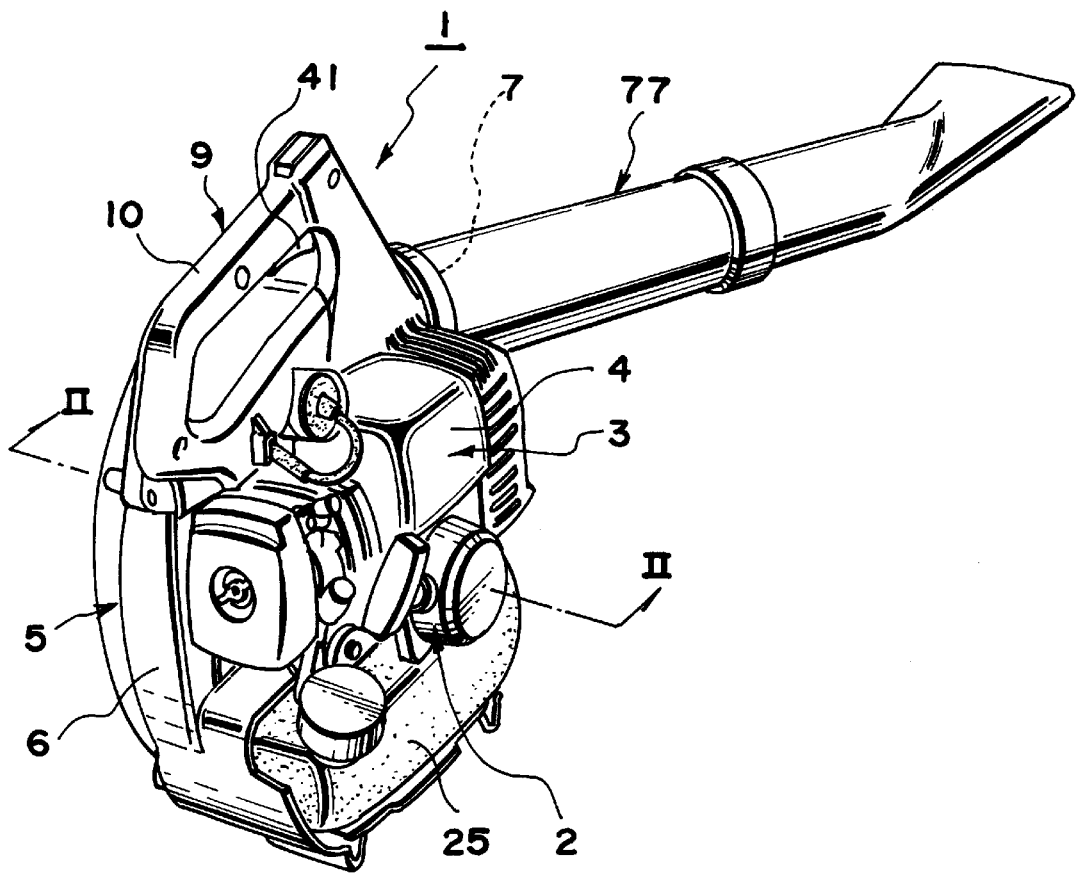
FIG. 1 is a schematic perspective view of a power blower in accordance with the first embodiment of the present invention.

As shown in FIG. 1, the power blower 1 is provided with a small-sized and air-cooled two-cycle gasoline engine 3 adapted to be started by a recoil starter 2. The engine 3, which is covered by an engine cover 4 molded integrally with a fan case 6, is used to drive a fan 5 that serves to carry out blowing work. Flowing air produced by the fan 5 is discharged from a discharge opening 7 placed on the front side of the fan case 6, for example, through a detachable discharge pipe 77.

Figure 2:
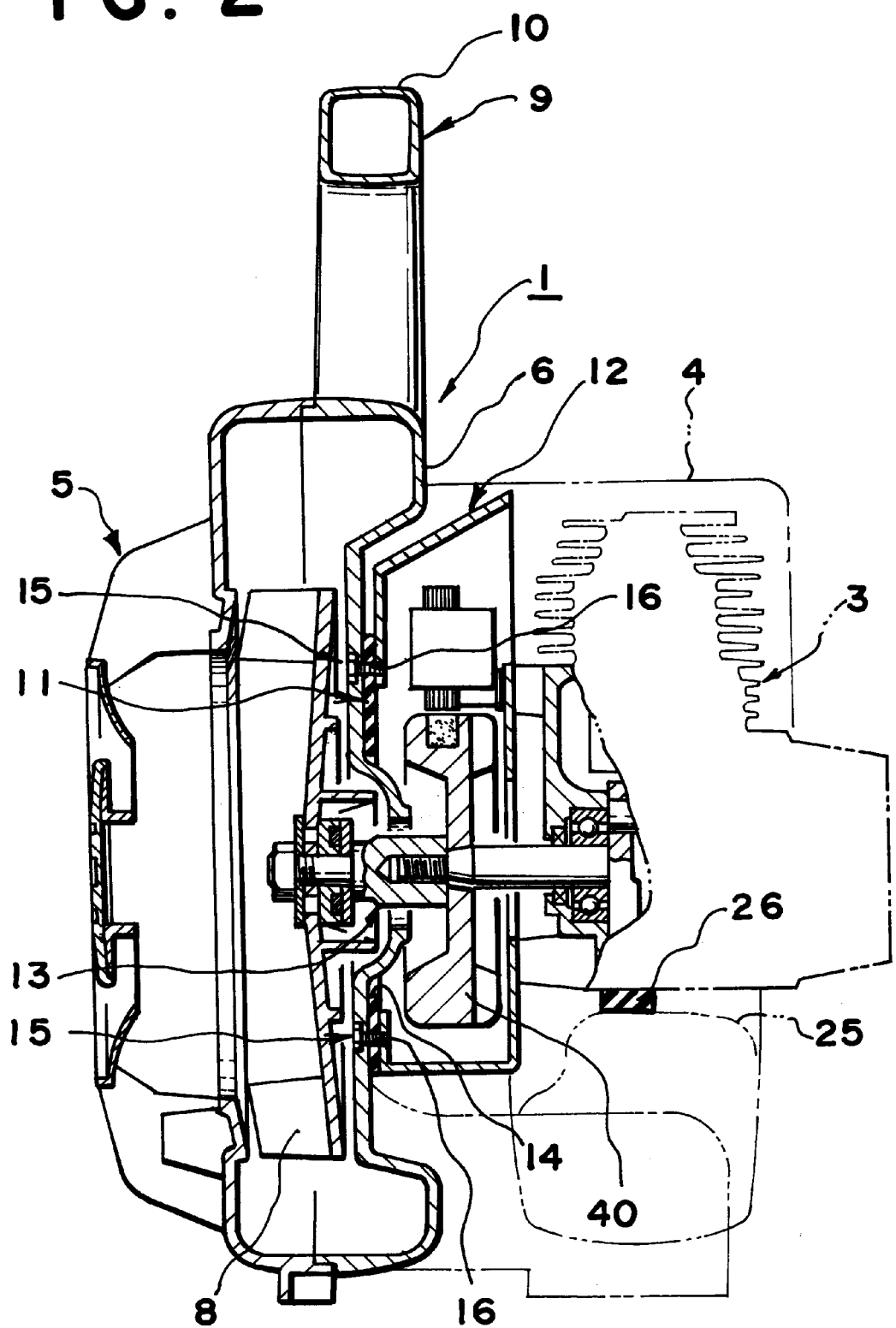
FIG. 2 is a longitudinal sectional view of main portions of the power blower of FIG. 1 taken along the line II—II.

As shown in FIG. 2, the fan 5 is provided with a centrifugal blower 8 which is housed within the fan case 6 integrally molded with the engine cover 4 and a handle 9 which touches a human body is disposed on the upper part of the fan case 6. The handle 9 may either be molded integrally with the fan case 6 or separately mounted subsequently to the fan case 6.

The blowing operation is carried out in such a manner that an operator grasps a grip of the handle 9, controls the rotation of the engine 3 using a throttle trigger 41 and drive the fan 5 to perform blowing.

A vibration-proof member 11 made of rubber plate having a high vibration-absorbing property is placed between the engine 3 and fan 5 to absorb the vibration transmitted from the engine 3 to the handle 9. According to the embodiment of the invention, as shown in FIG. 2, a plate-shaped vibration-proof member 11 is disposed between the outer face of the case 12 of a magnet-0 rotor 40 and the fan case 6. The magnet-0 rotor 40 serves also as a cooling fan for the engine 3. The vibration-proof member 11 is provided, in its center area, with a power transmission insertion hole 14 through which a power transmission portion 13 is allowed to pass. The power transmission portion 13 serves to transmit power from the engine 3 to the fan 5. The vibration-proof member 11 is further provided with an appropriate numbers of bolt insertion holes 16 located radially outside of the power transmission insertion hole 14.

Figure 3:
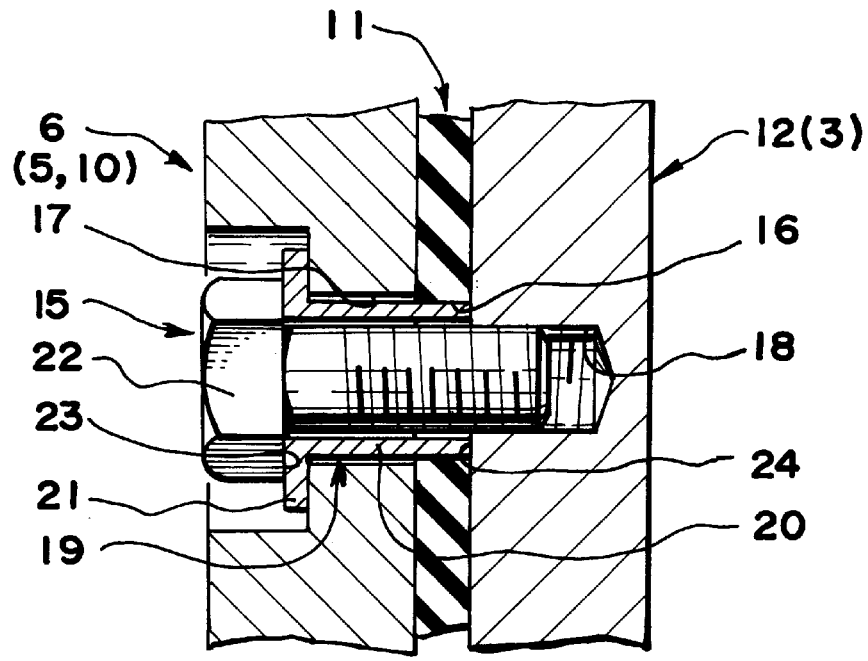
FIG. 3 is an enlarged view of the main portions of the power blower of FIG. 2.

The bolt insertion holes 16 allow insertion of a bolt 15 for the purpose of fastening and connecting. The bolt 15 is used to fasten the magnet-0 rotor case 12 and the fan case 6 in the direction approaching each other and connect them. As shown in FIG. 3, the bolt 15 is inserted into a mounting hole 17 formed on the fan case 6 and subsequently screwed into a threaded hole 18 preformed on the magnet-0 rotor case 12.

Also, as shown in FIG. 3, a short pipe with a flange 19 is disposed between the bolt 15 and the magnet-0 rotor case 12. The short pipe 19 serves as a spacer. The pipe 19 is made of a rigid metal and includes a pipe portion 20 and a flange 21 which are both formed integrally. The bolt 15 is inserted into the pipe 19 from the side of the flange 21 and is subsequently screwed into the hole 18 of the magnet-0 rotor case 12. The diameter of the mounting hole 17 of the fan case 6 is dimensioned such that the pipe portion 20 can be inserted in a loose state.

The pipe 19 has a predetermined axial length and thus limits the extent to which the bolt 15 can be screwed into the threaded hole 18. Thus, when the bolt 15 is fastened, the pipe 19 touches a lower face 23 of a head 22 of the bolt 15 and the outer side face 24 of the threaded hole 18 of the magnet-0 rotor case 12, so that the pipe 19 serves to limit compressive force acting between the magnet-0 rotor case 12 and the fan case 6 to the effective vibration-proof action range of the vibration-proof member 11. The length of the pipe portion 20 of the pipe 19 is predetermined so as to serve as a spacer.

Figure 4:
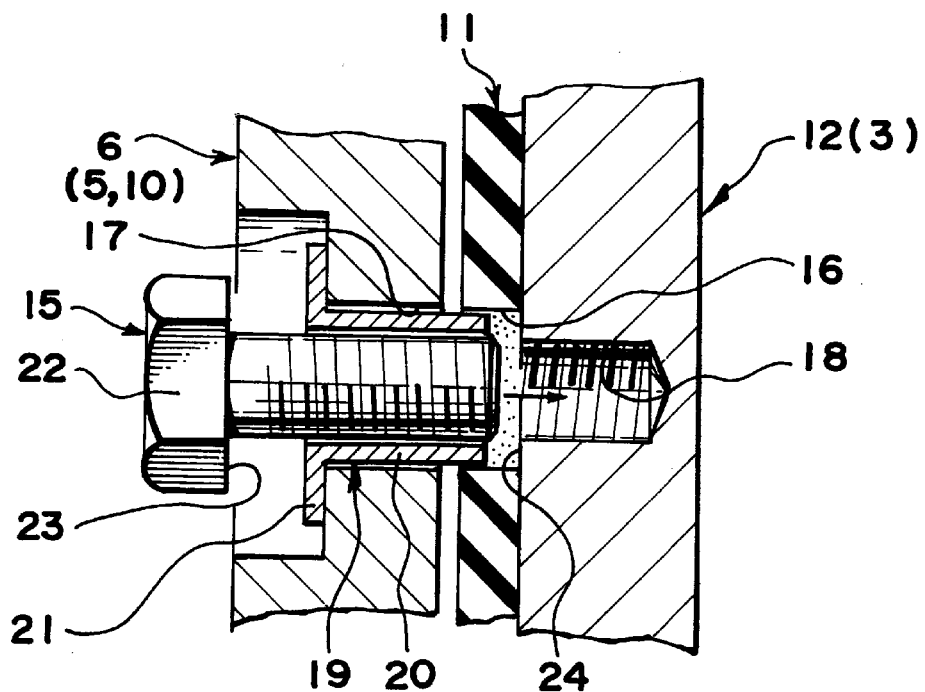
FIG. 4 is an explanatory view illustrating the method for fixing a bolt.

To assemble the power blower 1, as shown in FIG. 4, the bolt 15 is inserted into the pipe 19 and the bolt 15 together with the pipe 19 is inserted into the mounting hole 17 of the fan case 6. The bolt 15 is then screwed into the threaded hole 18 of the magnet-0 rotor case 12. As shown in FIG. 3, when the bolt 15 is fastened to the extent that it will not be turned any further, the magnet-0 rotor case 12 and the fan case 6 can be connected each other without interfering with the vibration absorbing action of the vibration-proof member 11. Thus, the introduction of the pipe 19 eliminates the need for checking the fastening degree in relation to the vibration-proof effect and the vibration-proof member 11, allowing easy attachment of the vibration-proof member 11 thereto.

The flange 21 of the pipe 19 also serves as a washer since it is placed between the lower face 23 of the head 22 of the bolt 15 and the fan case 6. This helps reduce the number of parts used (parts count is decreased), which enables easy management of parts.

Additionally, in accordance with another aspect of the first embodiment, as shown in FIG. 2, a rubber vibration-proof member 26 is mounted between the engine 3 and a fuel tank 25 disposed on the side of the fan case 6.

Figure 5:
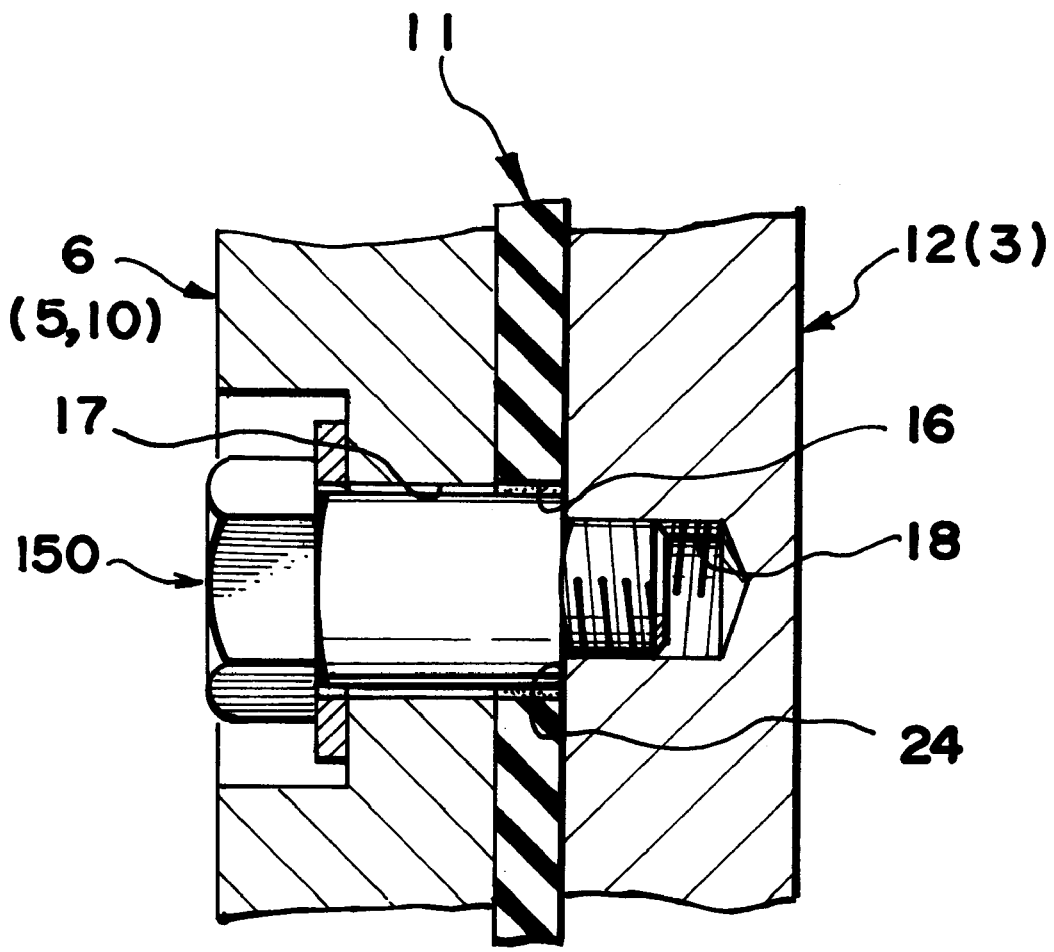
FIG. 5 is yet another explanatory view showing a bolt fixing method using a stepped bolt.

FIG. 5 shows a variant of the first embodiment according to the present invention in which an alternative structure can be used to obtain the previously described benefit. As shown in FIG. 5, instead of the bolt 15 and the pipe 19, a stepped bolt 150 that functions as both a bolt and a spacer is used. Stepped bolts 150 of the type shown in FIG. 5 are well-known mechanical elements and can be used in the same manner as above.

As noted previously in connection with the embodiment shown in FIG. 2, a rubber vibration-proof member 26 can be mounted between the engine 3 and a fuel tank 25 disposed on the side of fan case 6.

Figure 6:
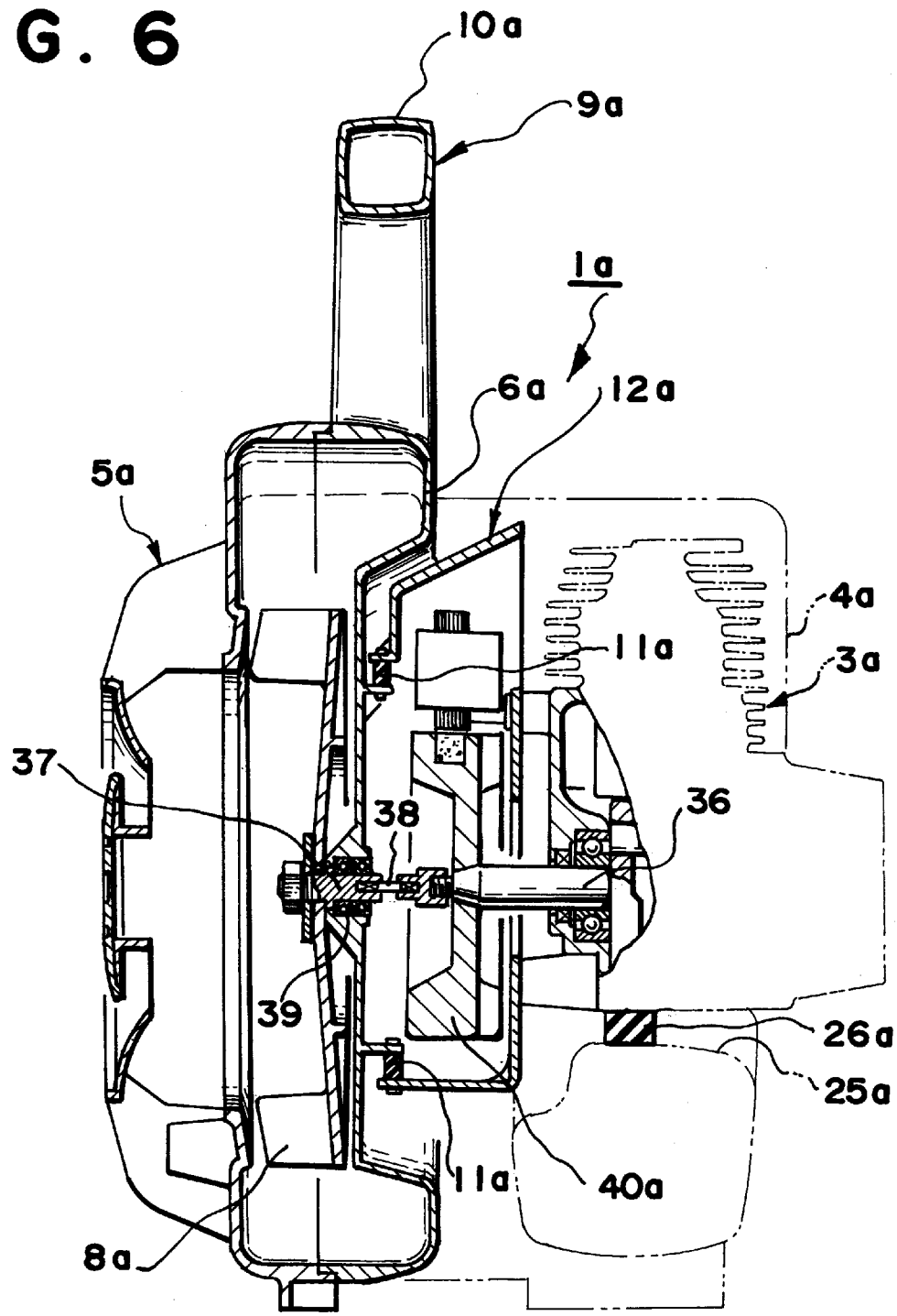
FIG. 6 is a longitudinal sectional view of main portions of the power blower in accordance with the second embodiment of the present invention.

Referring to FIG. 6, a power blower in accordance with a second embodiment of the present invention will be described. FIG. 6 corresponds partially to FIG. 2 and any element being equivalent to that shown in the first embodiment described above has the same reference number with an additional character "a" in FIG. 6.

In a power blower 1a in accordance with the second embodiment, a plurality of a rubber and columnar vibration-proof members 11a are disposed between a fan case 6a and a magnet-0 rotor case 12a. Each of the rubber and columnar vibration-proof members 11a is designed to have excellent vibration-absorbing properties. In particular, the vibration-proof members 11a have a small cross-sectional area and cylindrical shape. This design has been found to effectively reduce vibration transmitted from the engine 3a to the fan case 6a side.

Figure 7:
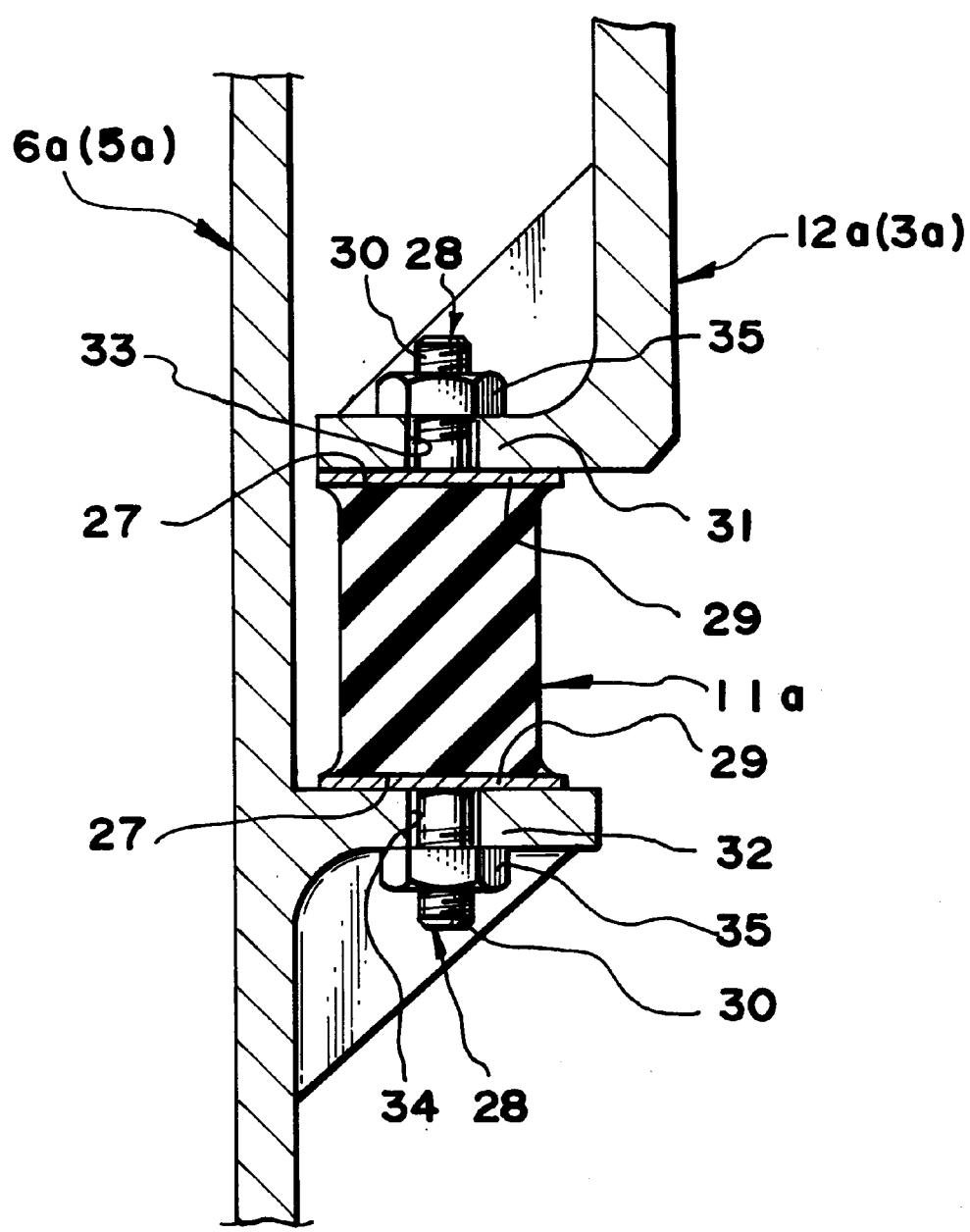
FIG. 7 is an enlarged view of main portions of the power blower of FIG. 6.

FIG. 7 is an enlarged view of the vibration-proof member 11a seen in the upper part of FIG. 6. As shown in FIG. 7, mounting metal fixtures 28 are fixed on both upper and lower end surfaces 27, 27 of the vibration-proof member 11a. These metal fixtures 28 have screw rods 30 that extrude from the center portion of circular plate metal fixture 29. The plate metal fixture 29 is fixed by a adhering process to the upper and lower end surfaces 27 of the vibration-proof member 11a with each screw rod 30 extending in the upper and lower direction.

On the other hand, the magnet-0 rotor case 12a and the fan case 6a have extending portions 31 and 32 each being parallel to attach the vibration-proof member 11a. The extending portions 31, 32 have mounting holes 33 and 34 to receive the screw rods 30 of the metal fixtures 28. The screw rods 30 of the metal fixtures 28 are inserted into the mounting holes 33 and 34 respectively and fixed with nuts 35 either in the upper or lower direction. Thus, the magnet-0 rotor case 12a (and hence the engine 3a) is connected through the vibration-proof member 11a with the fan case 6a, ensuring that vibration is absorbed between them.

Furthermore, the shape and the way of placement of the vibration-proof member in the second attachment differs from that in the first embodiment and relative freedom of displacement between the engine 3a and the fan 5a in the second embodiment is larger than that in the first embodiment.

As shown in FIG. 6, a flexible shaft 38 may be used to easily transmit rotation power from the engine 3a to the fan 5a, in spite of a change in the relative positional relation between an output axis 36 of the engine 3a and an input axis 37 supported as to be freely rotated by bearings 39 on the fan case 6a. Specifically, the output axis 36, whenever driven, is connected through the flexible shaft 38 to be used as a universal transmitting means to the input axis 37 of the fan 5a in the second embodiment of the present invention. The flexible shaft 38 also serves to reduce vibration transmitted through a power transmission system to the fan case 6a.

In addition, instead of the flexible shaft 38, a universal joint (coupling) or rubber coupling, etc., can be applied as well.

Moreover, in the second embodiment, the fan case 6a is not rigidly secured to the magneto rotor case 12a (the only connection is through the vibration-proof members 11a. Thus, there is no fear that the relative position between the fan case 6a and centrifugal blower 8a will change. It follows that the clearance between the fan case 6a and the centrifugal blower 8a can be made small, thus improving the blowing performance.

What is claimed is:

1. In a portable power tool that includes a power source and a human body contacting portion, the power tool comprising:

a vibration-proof member disposed between the power source and the human body contacting portion for absorbing vibration transmitted from the power source side to the human body contacting portion side, the vibration-proof member having a compressive power that is effective within a known range for absorbing vibration transmitted from the power source side to the human body contacting portion side;

means for fastening and connecting the power source and the human body contacting portion to one another; and a spacer for limiting the vibration-proof member's compressive power which acts between the power source side and the human contacting portion side to an amount within the effective vibration-proof range by using the fastening and connecting means.

2. The portable power tool as defined in claim 1, wherein a bolt is used as the fastening and connecting means and a pipe into which the bolt is inserted is used as the spacer.

3. The portable power tool as defined in claim 2, wherein the pipe has a flange which is formed integrally at the end portion of the pipe and wherein the flange also serves as a washer.

4. The portable power tool as defined in claim 1, wherein a stepped bolt is used to serve both as the fastening and connecting means and the spacer.

5. A portable power tool comprising;

a power source located on a power source side of the tool, the power source having an output axis;

a working member driven by the power source, the working member being disposed on a working member side of the power tool and the working member having an input axis;

a human body contacting portion disposed on the working member side of the power tool;

a vibration-proof member placed between the power source side and the working member side, the vibration proof member being adapted to absorb vibration transmitted from the power source side to the working member side; and universal power transmission means that can transmit rotation power from the power source to the working member in spite of a change in the relative positional relation of the power source to the working member, caused by the vibration-proof member, the universal power transmission means being located between the output axis of the power source and the input axis of the working member.

* * * * *